(12) United States Patent
Atkinson et al.

(10) Patent No.: US 7,461,876 B1
(45) Date of Patent: Dec. 9, 2008

(54) VEHICLE DOOR STRUCTURES HAVING ANTI-CHIPPING PERFORMANCE

(75) Inventors: Aaron William Joseph Atkinson, Phoenix, AZ (US); George Holmes, Ann Arbor, MI (US)

(73) Assignee: Toyota Motor Engineering and Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 11/757,464

(22) Filed: Jun. 4, 2007

(51) Int. Cl.
*B60R 19/42* (2006.01)

(52) U.S. Cl. ................................ 293/128

(58) Field of Classification Search ............ 293/128; 296/209
See application file for complete search history.

(56) References Cited

U.S. PATENT DOCUMENTS

| | | | |
|---|---|---|---|
| 4,041,999 A | 8/1977 | Miller | |
| 4,493,506 A * | 1/1985 | Alexander | 293/128 |
| 4,547,994 A | 10/1985 | Adell | |
| 4,679,290 A | 7/1987 | Adell | |
| 4,786,094 A * | 11/1988 | Barton et al. | 293/128 |
| 5,090,762 A | 2/1992 | Krieger | |
| 5,186,509 A * | 2/1993 | Tyves | 293/128 |
| 5,229,175 A * | 7/1993 | Seabolt | 293/128 |
| 5,347,759 A | 9/1994 | Kobayashi et al. | |
| 5,480,714 A | 1/1996 | Ito et al. | |
| 5,762,394 A | 6/1998 | Salmonowicz et al. | |
| 6,171,543 B1 | 1/2001 | Hirose | |
| 6,254,170 B1 | 7/2001 | Farmer et al. | |
| 7,010,886 B2 | 3/2006 | Deguchi et al. | |
| 2004/0150235 A1* | 8/2004 | Cornet et al. | 293/128 |

* cited by examiner

*Primary Examiner*—Lori L Lyjak
(74) *Attorney, Agent, or Firm*—Dinsmore & Shohl LLP

(57) ABSTRACT

Embodiments of a vehicle door structure are provided, wherein the door structure comprises a door panel configured to couple to a vehicle frame. The door panel comprises at least one clip receptacle disposed on a lower portion of the door panel. The vehicle door structure comprise a molding component comprising at least one clip, wherein the molding component is flush mounted to the lower portion of the door panel, wherein the at least one clip engages the least one clip receptacle of the door panel.

14 Claims, 3 Drawing Sheets

US 7,461,876 B1

VEHICLE DOOR STRUCTURES HAVING ANTI-CHIPPING PERFORMANCE

TECHNICAL FIELD

Embodiments of this invention relate generally to vehicle door structures, and specifically relate to vehicle door structures comprising lower door moldings configured to block road debris.

BACKGROUND

In the automotive industry, durability and aesthetic appeal are always important goals which drive the designer/engineer. This is especially true of vehicle door structures, which produce functional benefits, while also possessing visually appealing styling and shape. That being said, vehicle door structures experience significant wear and tear due to frequent uses as well as road conditions. For instance, the vehicle door structure is subject to road debris and dirt, as well as rusting, etc. This road debris may be additionally problematic, because of the gap between the vehicle door structure and the vehicle body, which must be properly sealed. Due to these detrimental effects, the durability of the door structure, especially at the lower portions of the door structure, as well as the aesthetic appearance of the door structure, may be affected.

Accordingly, there is a need for vehicle door structures and components thereof, which increase the performance of the door structures while maintaining aesthetic appeal.

SUMMARY

In accordance with one embodiment of the present invention, a vehicle door structure is provided. The vehicle door structure comprises a door panel configured to couple to a vehicle frame. The door panel comprises at least one clip receptacle disposed on a lower portion of the door panel. The vehicle door structure further comprises a molding component comprising at least one clip, wherein the molding component is flush mounted to the lower portion of the door panel, wherein the at least one clip engages the least one clip receptacle of the door panel.

In accordance with another embodiment of the present invention, a vehicle door structure is provided. The vehicle door structure comprises a door panel configured to couple to a vehicle frame. The door panel comprises a plurality of clip receptacles disposed on a lower portion of the door panel. The vehicle door structure further comprises a coated plastic molding component comprising a plurality of clips, wherein the molding component is flush mounted to the lower portion of the door panel by inserting the plurality of clips into the plurality of receptacles. The molding component is configured to substantially block road debris from contacting the door panel without using a rocker molding through a lower lip of the molding component that extends under the lower portion of the door panel.

In accordance with yet another embodiment of the present invention, a method of protecting a vehicle door structure from road debris is provided. The method comprises the steps of: providing a door panel comprising at least one clip receptacle disposed on a lower portion of the door panel; and flush mounting a molding component to the lower portion of the door panel by inserting at least one clip of the molding component into at least one receptacle of the door panel. The molding component comprises a lower lip extending under the door panel to substantially block road debris from contacting the door panel without the use of a rocker molding.

Additional features and advantages provided by the embodiments of the present invention will be more fully understood in view of the following detailed description, in conjunction with the drawings.

BRIEF DESCRIPTION OF THE DRAWINGS

The following detailed description of specific illustrative embodiments of the present invention can be best understood when read in conjunction with the following drawings, where like structure is indicated with like reference numerals and in which.

Figure 1:
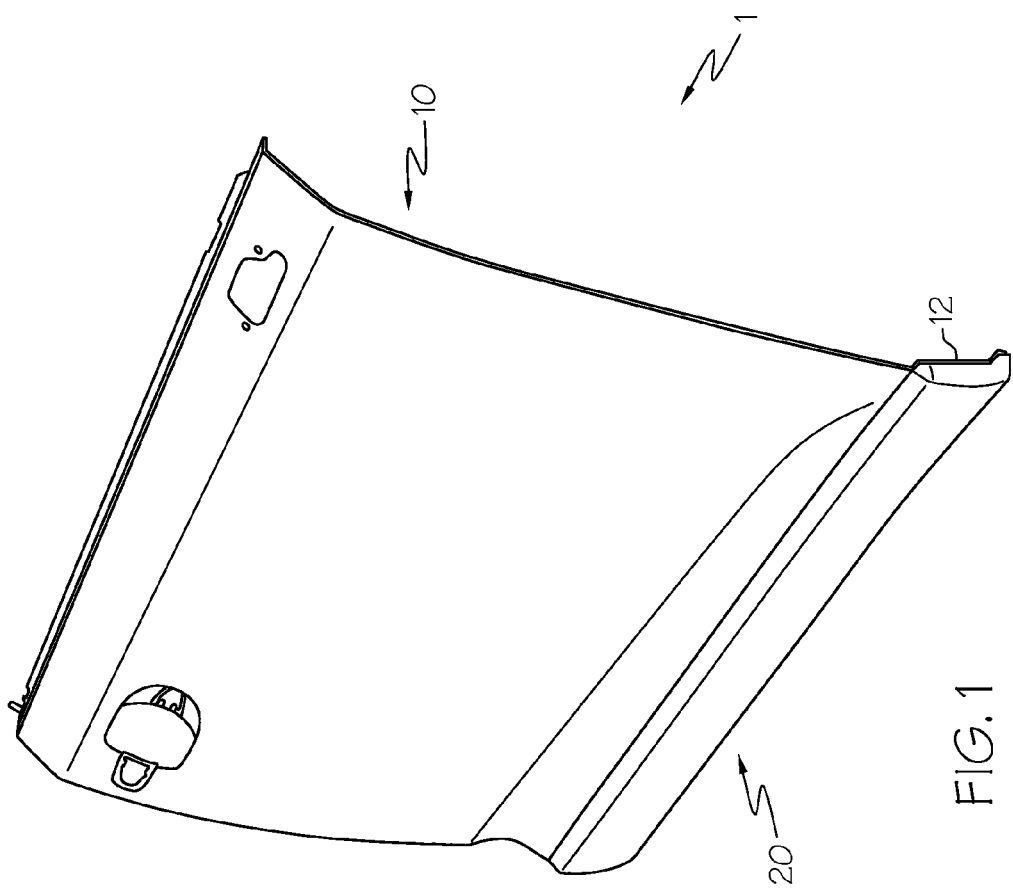
FIG. 1 is a front perspective view of a vehicle door structure according to one or more embodiments of the present invention.
Figure 2:
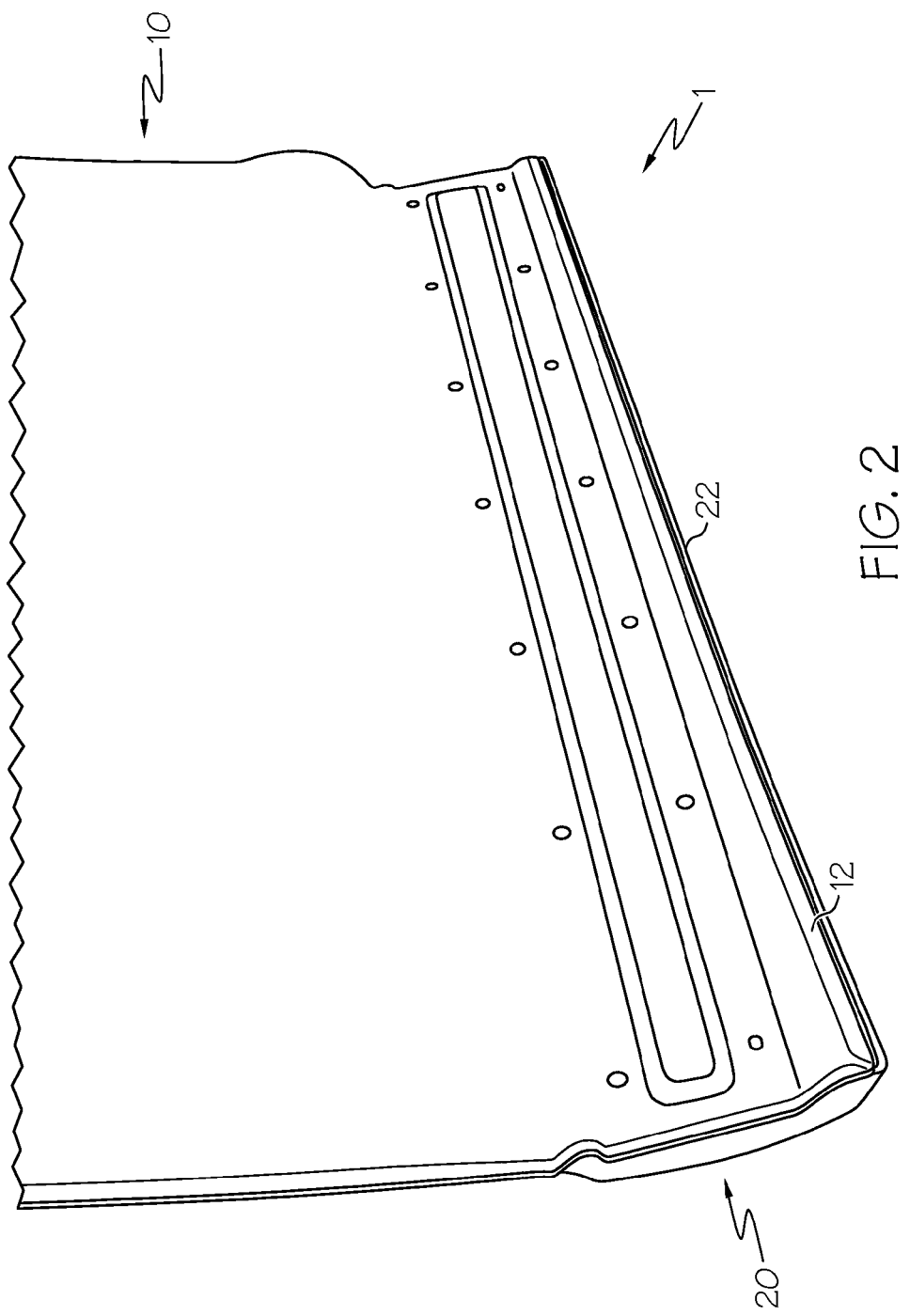
FIG. 2 is a rear perspective view of a vehicle door structure according to one or more embodiments of the present invention.

The embodiments set forth in the drawings are illustrative in nature and not intended to be limiting of the invention defined by the claims. Moreover, individual features of the drawings and the invention will be more fully apparent and understood in view of the detailed description.

DETAILED DESCRIPTION OF ILLUSTRATIVE EMBODIMENTS

Figure 4:
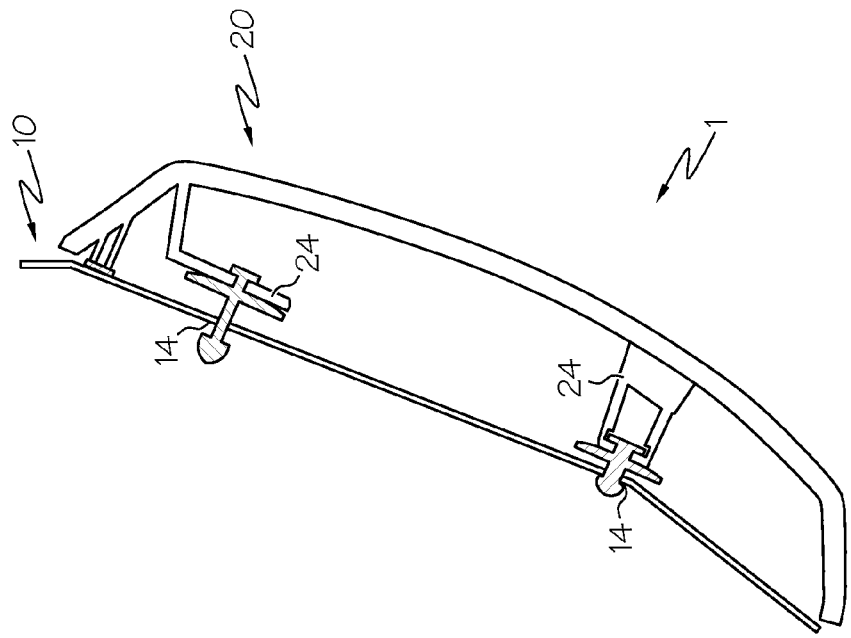
FIG. 4 is a side cross-sectional view of a lower door molding according to one or more embodiments of the present invention.

Referring generally to FIGS. 1-4, a vehicle door structure 1 is provided, the vehicle door structure 1 comprises a door panel 10 configured to couple to a vehicle frame (not shown). As used herein, the door panel 10 refers to outer sheeting or skin of a vehicle door, for example, the outer sheet metal of the vehicle door. At a lower portion 12 of the door panel 10, the door panel 10 may be coupled to a molding component 20. The lower portion 12 of the door panel 10 and the molding component 20 may be coupled via various mechanisms known to one of ordinary skill in the art. In one exemplary embodiment as shown in FIG. 4, the molding component 20 may comprise at least one clip 24, and the lower portion 12 of the door panel 10 may comprise at least one clip receptacle 14. For coupling, the at least one clip 24 is inserted into the least one clip receptacle 14 of the lower portion 12 until the molding component 20 is flush mounted against the lower portion 12 of the door panel 10. For increased retention of the molding component 20 to the door panel 10, a plurality of clips and clip receptacles may be used.

As used herein, "flush mounting" defines the coupling arrangement between the lower portion 12 of the door panel 10 and the molding component 20, wherein the molding component 20 is dimensioned such that a substantial portion of the interior surface is in contact with the outer surface of the lower door portion 12. In essence, the dimensions and shapes of the interior surface of the molding component 20 are configured to substantially match the dimensions and shapes of the outer surface of the lower portion 12 of the door panel 10, in some embodiments. Accordingly, in some embodiments, a cross-section taken along at least one section of door 12 and molding 20 would reveal complete contact and no gap between the two, such that road debris and moisture is prevented from contacting the door panel 10. By flush mounting using clips 14, the vehicle door structure 1 has a durable coupling mechanism between the door panel 10 and molding component 20, while maintaining the aesthetic appeal of the shapes and styling of the vehicle door structure 1. Such clips 14 can be placed integrally or separately along the interior of the molding component so that the fastener, e.g. clip is not visible from outside the vehicle. The vehicle door may have a corresponding structure to engage the clip on the molding 20. As shown in FIG. 4 the clip can comprise engaging male and female structures, one of each provided on the molding 20 and door portion 12 to hold the molding in place. Because the clip on the interior of the molding, no attachment mechanisms are visible from the extension. To further ensure the aesthetic appeal, the molding component 20 may, in a further embodiment, comprise a color which matches the color of the door panel 10.

In further embodiments, the lower portion 12 of the door panel 10 may comprise clip receptacles 14 disposed at multiple locations along the lower portion 12 of the door panel 10. Furthermore, it is contemplated to use more clips and/or receptacles than are necessary for coupling the molding 20 to the door panel 10, such that the molding 20 can be moved to a number of different spots along the door panel 10. This facilitates flush mounting of the molding component 20 at multiple locations along the lower portion 12 of the door panel 10. Conversely, the molding component 20 may also comprise clips 24 disposed at multiple locations along the molding component 20 to facilitate flush mounting of the molding component 20 at multiple locations along the lower portion 12 of the door panel 10. In other embodiments, the clip receptacles 14 may be stamped through or drilled into the outer sheet metal of the door panel 10.

Figure 3:
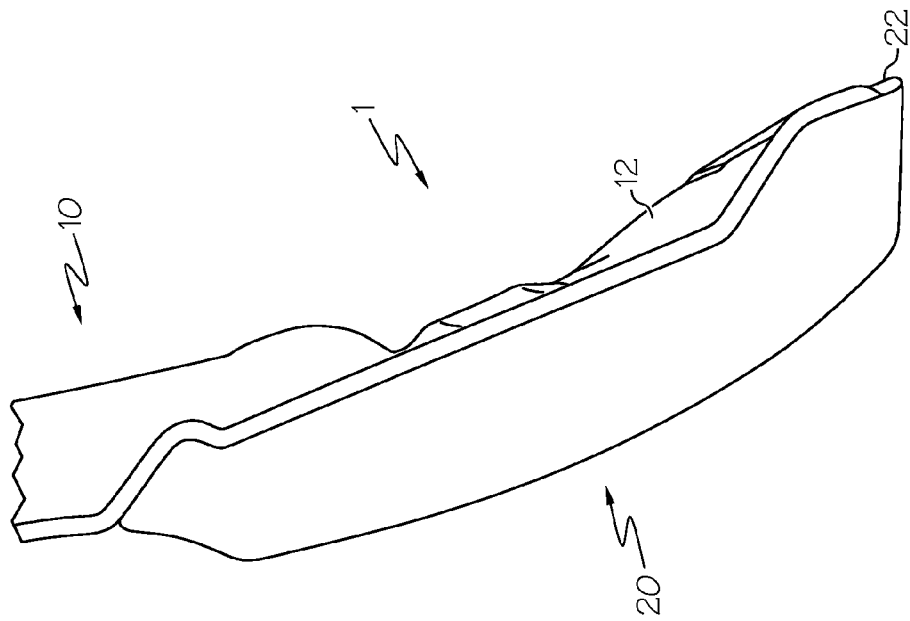
FIG. 3 is a side perspective view of a lower door molding according to one or more embodiments of the present invention.

In the exemplary embodiment of FIG. 3, the molding component 20 may comprise a lower lip 22 extending under the door panel 10. This lower lip 22 substantially prevents and/or blocks debris from contacting and possibly damaging the door panel 10. As defined herein, "debris" refers to any object, for example, road objects such as rocks and stones, which may cause chipping on the surface of the door panel 10. The molding component 20, due in part to the lower lip 22, is beneficial because it may block debris without the use of a rocker molding or another debris blocking component known to one of ordinary skill in the art.

The molding component 20 may comprise various materials known to one of ordinary skill in the art. For example, the molding component 20 may comprise a rigid material, such as a plastic or rigid polymeric material. To produce the desired shapes and dimensions of the molding component 20, the plastic material may be produced via extrusion, injection molding, or other processes known to one of ordinary skill in the art. In a further exemplary embodiment, the molding component 20 may comprise a coating overlaying the plastic. The coating may comprise a paint material, wherein the paint material composition is composed of protective materials.

It is noted that terms like "specifically," "preferably," "typically", and "often" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention. It is also noted that terms like "substantially" and "about" are utilized herein to represent the inherent degree of uncertainty that may be attributed to any quantitative comparison, value, measurement, or other representation.

While particular embodiments and aspects of the present invention have been illustrated and described, various other changes and modifications can be made without departing from the spirit and scope of the invention. Moreover, although various inventive aspects have been described, such aspects need not be utilized in combination. It is therefore intended to cover in the appended claims all such changes and modifications that are within the scope of this invention.

What is claimed is:

1. A vehicle door structure comprising:
    a door panel configured to couple to a vehicle frame, and comprising at least one clip receptacle disposed on a lower portion of the door panel; and
    a molding component comprising at least one clip, the molding component being flush mounted to the lower portion of the door panel the least one clip receptacle of the door panel, wherein the molding component comprises a lower lip extending under the door panel.

2. A vehicle door structure according to claim 1 wherein the at least one clip receptacle is disposed at multiple locations along the lower portion of the door panel to facilitate flush mounting of the molding component at multiple locations along the lower portion of the door panel.

3. A vehicle door structure according to claim 1 wherein the molding component comprises plastic.

4. A vehicle door structure according to claim 3 wherein the molding component comprises a coating overlaying the plastic.

5. A vehicle door structure according to claim 1 wherein the molding component is the same color as the door panel.

6. A vehicle door structure according to claim 1 wherein the vehicle door structure does not include a rocker molding.

7. A vehicle door structure according to claim 1 wherein no gap is present between the door panel and molding component along at least one cross-section of the door panel and molding component.

8. A vehicle door structure according to claim 1 wherein the interior surface of the molding component substantially matches the exterior of a lower portion of the door panel.

9. A vehicle door structure comprising:
    a door panel configured to couple to a vehicle frame, and comprising a plurality of clip receptacles disposed on a lower portion of the door panel; and
    a coated plastic molding component comprising a plurality of clips, the molding component being flush mounted to the lower portion of the door panel by inserting the plurality of clips into the plurality of receptacles, wherein the molding component is configured to substantially block road debris from contacting the door panel without using a rocker molding through a lower lip of the molding component that extends under the lower portion of the door panel.

10. A vehicle door structure according to claim 9 wherein the at least one clip receptacle is disposed at multiple locations along the lower portion of the door panel to facilitate flush mounting of the molding component at multiple locations along the lower portion of the door panel.

11. A vehicle door structure according to claim 9 wherein no gap is present between the door panel and molding component along at least one cross-section of the door panel and molding component.

12. A vehicle door structure according to claim 9 wherein the interior surface of the molding component substantially matches the exterior of a lower portion of the door panel.

13. A method of protecting a vehicle door structure from road debris comprising:

providing a door panel comprising at least one clip receptacle disposed on a lower portion of the door panel; and
flush mounting a molding component to the lower portion of the door panel by inserting at least one clip of the molding component into at least one receptacle of the door panel, wherein the molding component comprises a lower lip extending under the door panel to substantially block road debris from contacting the door panel without the use of a rocker molding.

14. A method according to claim 13 wherein the at least one clip receptacle is disposed at multiple locations along the lower portion of the door panel to facilitate flush mounting of the molding component at multiple locations along the lower portion of the door panel.

* * * * *